July 12, 1932.     W. B. STOUT     1,866,680
AIRPLANE
Filed Aug. 11, 1928     8 Sheets-Sheet 5
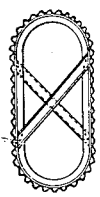
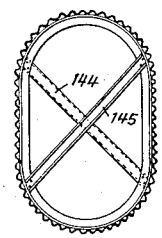
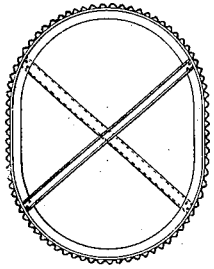
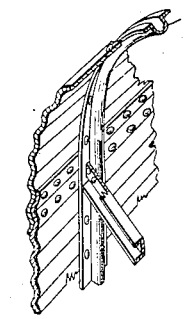
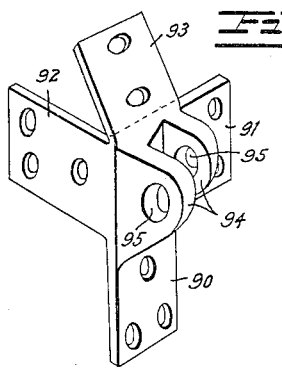
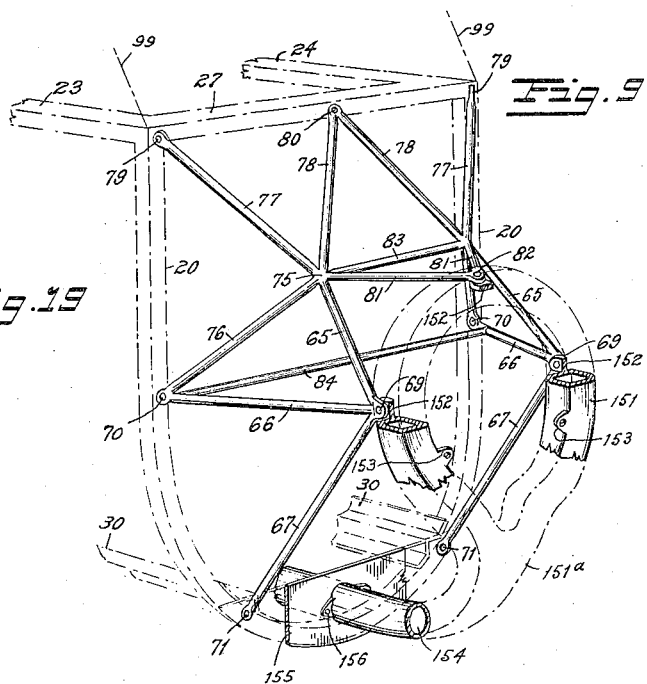
INVENTOR.
William B. Stout
BY
ATTORNEYS.

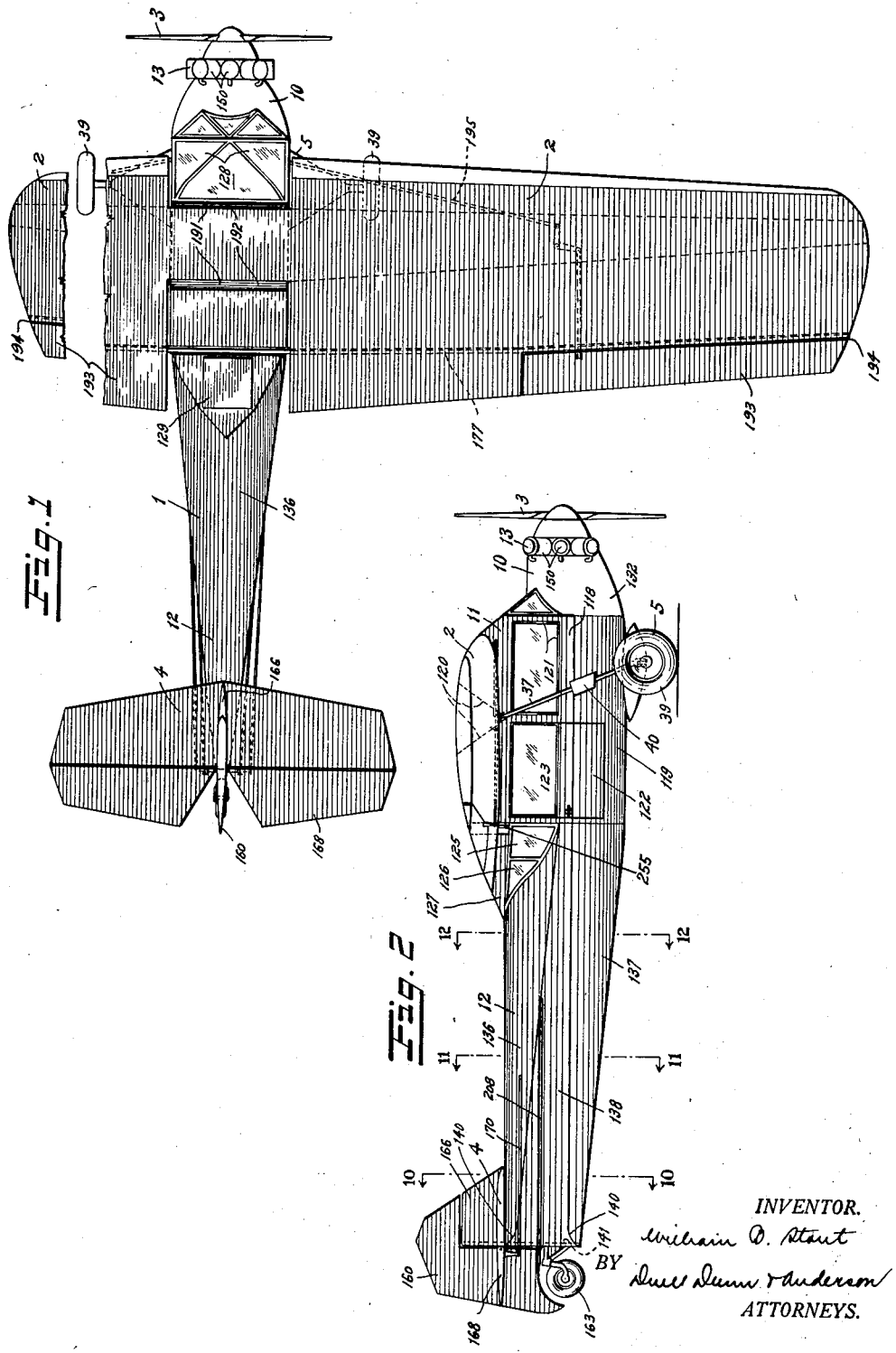

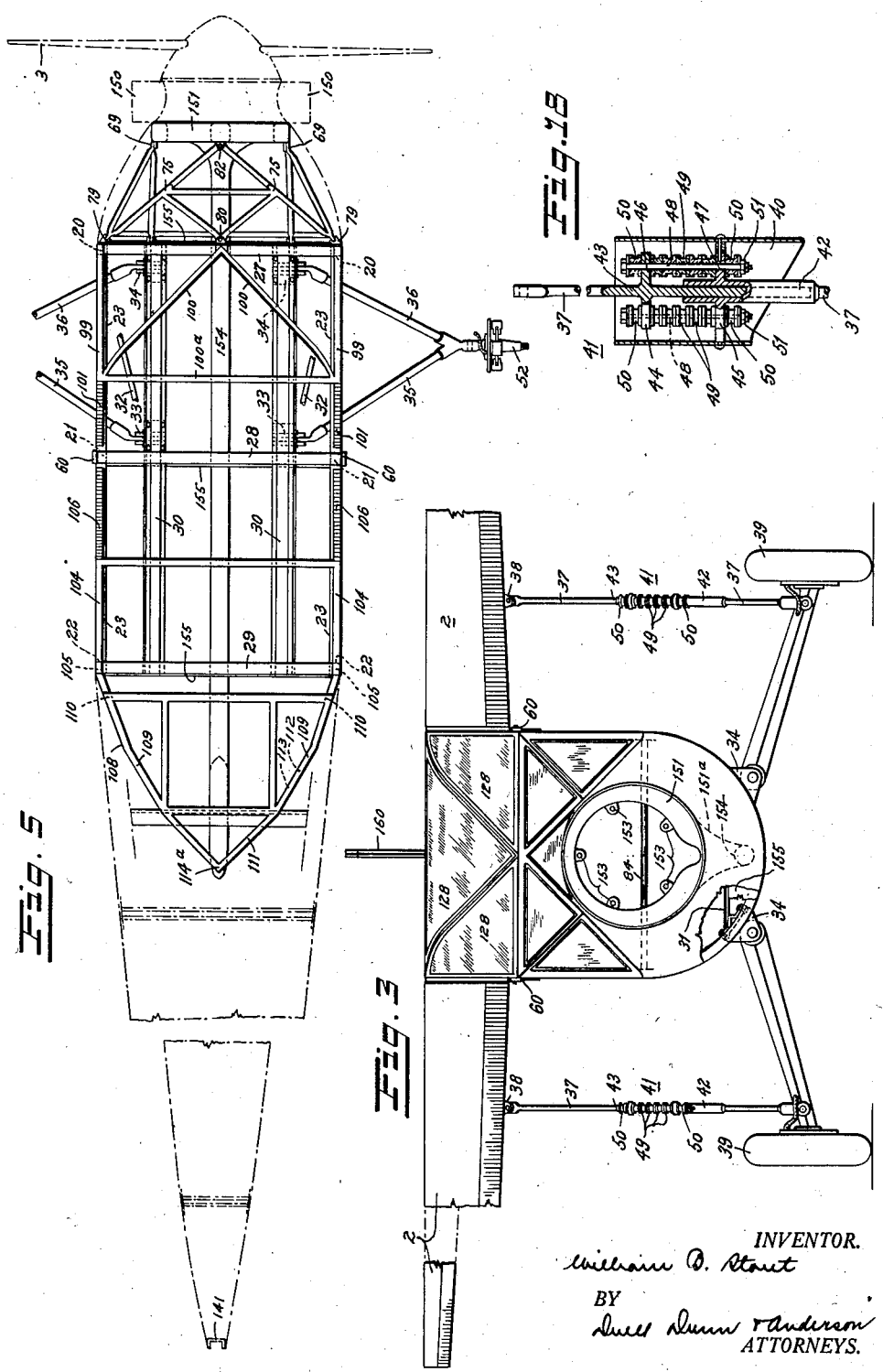

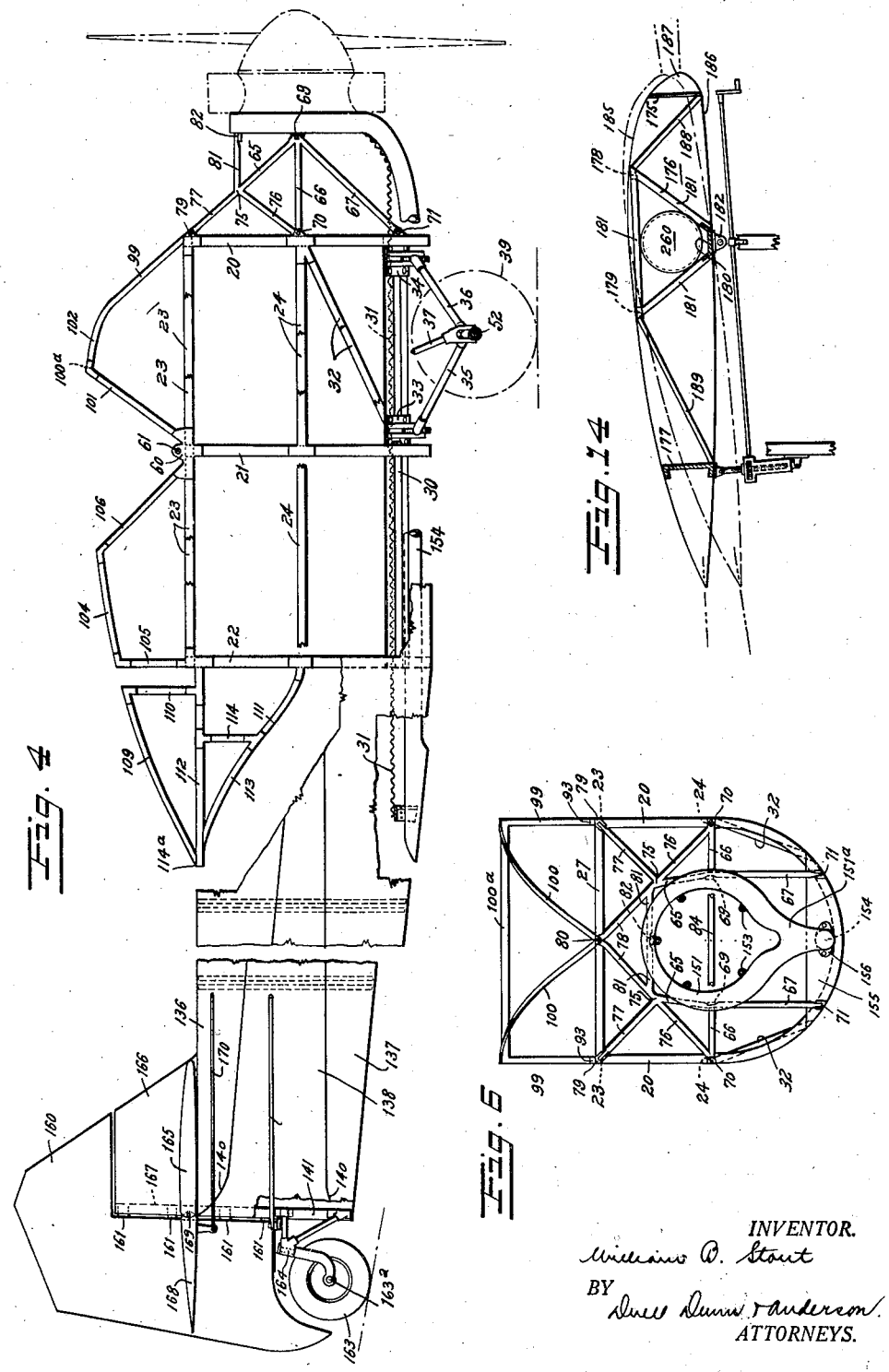

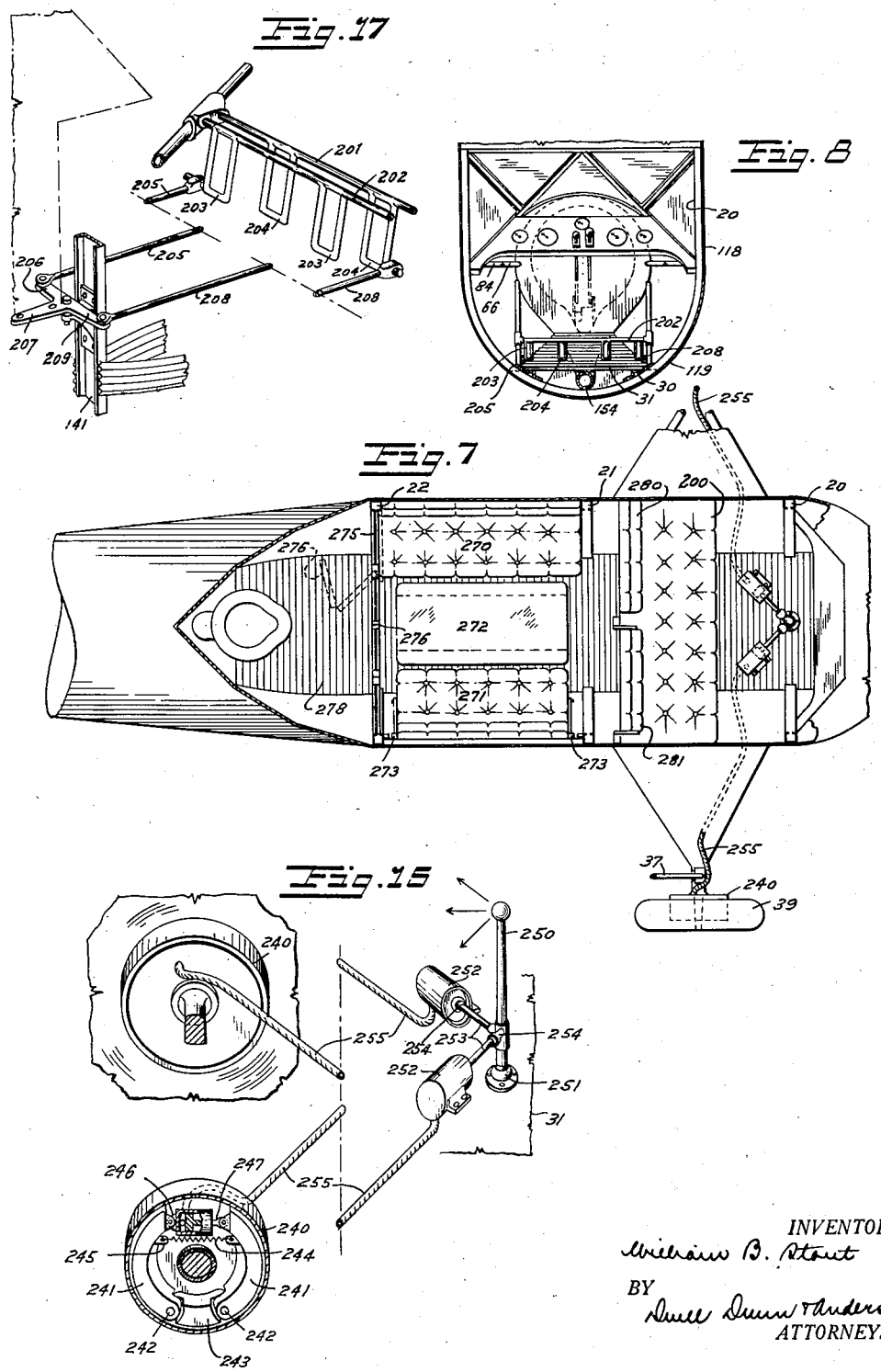

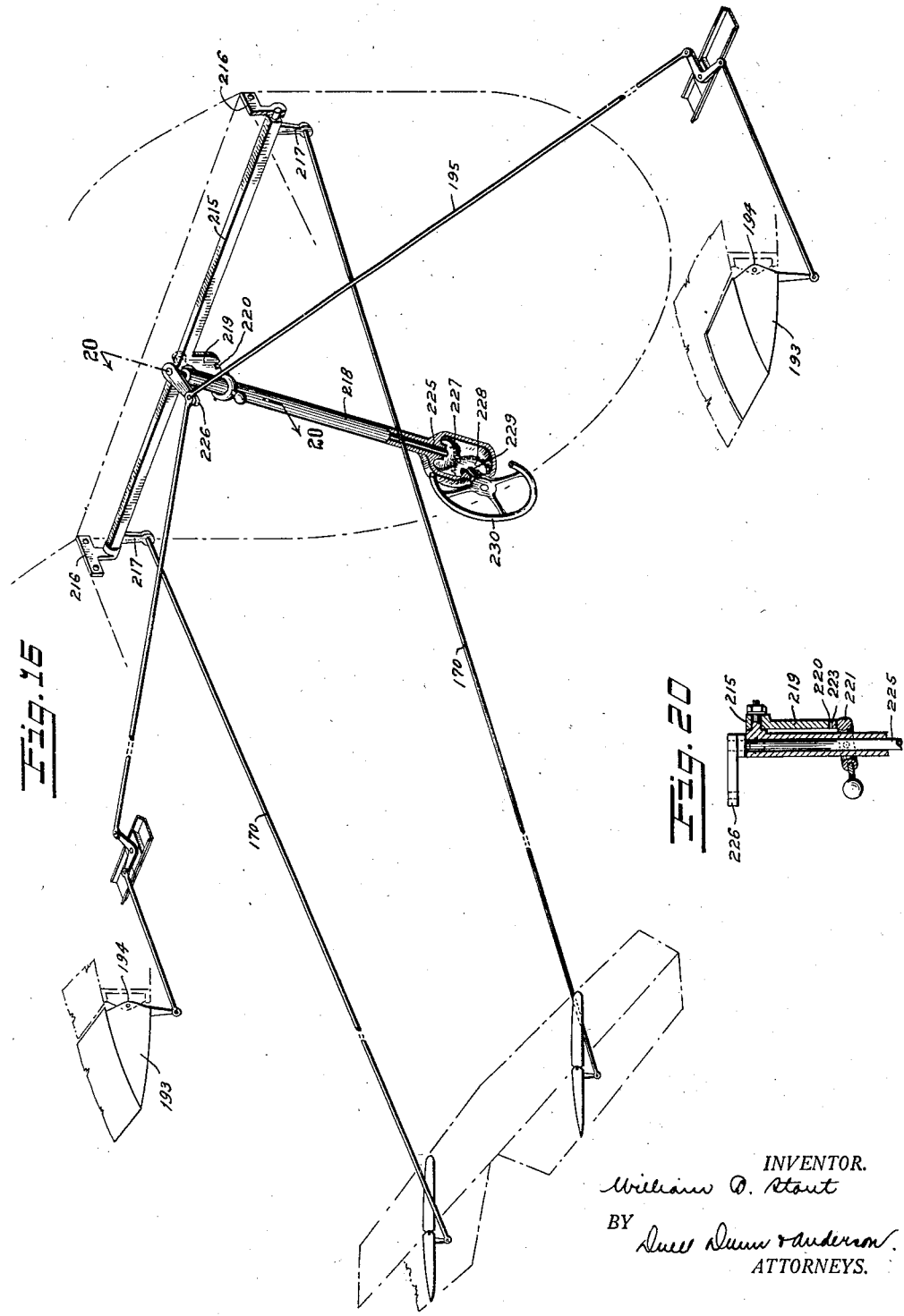

July 12, 1932.  W. B. STOUT  1,866,680
AIRPLANE
Filed Aug. 11, 1928   8 Sheets-Sheet 7

INVENTOR.
William B. Stout
BY
ATTORNEYS.

July 12, 1932.  W. B. STOUT  1,866,680
AIRPLANE
Filed Aug. 11, 1928  8 Sheets-Sheet 8

INVENTOR.
William B. Stout
BY
Dunn Dunn & Anderson
ATTORNEYS.

Patented July 12, 1932

1,866,680

UNITED STATES PATENT OFFICE

WILLIAM B. STOUT, OF DETROIT, MICHIGAN, ASSIGNOR TO FORD MOTOR COMPANY, OF HIGHLAND PARK, MICHIGAN

AIRPLANE

Application filed August 11, 1928. Serial No. 299,022.

This invention relates to airplanes. An object of this invention is to provide an airplane structure of minimum weight for maximum strength, and to this end it is an object to cause each of the portions of the plane to perform as many consistent services as possible; to reduce the number of parts in the complete machine.

It is a further object to produce a plane of great simplicity in production, and to this end it is an object to provide a plane in which the different parts are formed in detachably-assembled units in a new and improved manner such that each may be sub-assembled and tested prior to complete assembly. This facilitates quantity production in that the various sub-assembled units are well adapted for separate fabrication. Furthermore, the assemblage of the plane and the replacement of parts of it in the field are very much simplified, since the only work required in final assemblage or replacement is the fastening together of the various sections. It is thus unnecessary for the workmen to climb in and out of the machine to the detriment of the structure and finish.

The problem of airplane construction at the present time is not primarily one of aerodynamics or of structural engineering. It is easily possible to predict types of surfaces which would be aerodynamically correct if they could be practically built. It is also feasible to devise structures having great strength, but which are aerodynamically too inefficient to fly under practical conditions. The problem of airplane construction is the problem of coordinating the aerodynamic considerations with the structural design, to produce an airplane which will be practically adequate both in weight-carrying capacity, power, and speed, while at the same time possessing ample strength to resist the strains it may reasonably be expected to encounter. Some of the more specific features of this invention will be primarily connected with the construction of a metal airplane, and on that account the embodiment of the invention herein illustrated will be of that type, although it will be obvious that the broader features of the invention are independent of the material of construction.

In airplane service one of the primary considerations is the net lifting power of the plane, and since every pound saved in the weight of the plane, without changing its aerodynamic efficiency is a direct addition of one pound to the useful load which it can carry, it is clear that a saving in weight in the structure is of primary importance. At the same time, the safety of the plane and the safety of its passengers demand that this be accomplished without sacrifice of the needed strength.

It is an object of this invention, therefore, to secure these results, and to this end each part is caused to perform as many functions as possible, so that a saving of parts, and consequently, of weight otherwise required, may be effected.

Experience has shown that the exterior conformation of the plane has very great effect upon the force required to move it through the air, so that very great saving can be effected by a proper stream line configuration of the skin. It is, however, unduly expensive to form sheet metal or corrugated sheet metal into surfaces having a curvature in more than one plane. It is an object of this invention, therefore, to so design a practical and efficient airplane that all of the important exterior surfaces may be formed by bending the sheet around a mandrel having straight line elements such, for example, as a cylinder or cone, since such forming can be done without expanding or compressing metal as contrasted with surfaces which are curved in two planes, which must be "bumped" that is hammered to shape.

The principal strains upon an airplane are transmitted between the propeller, the fuselage, and the wings. These strains mutually react upon each other through the central portion of the airplane. It is an object of this invention so to construct the plane that it will have greater strength to withstand all such strains at the places where they occur, without thereby adding to the weight in other portions.

It is a further object to so group the functions of the machine in a novel and improved manner, into separable units so that, insofar as possible, the serviceability and functioning of each unit may be tested and determined before the final assemblage.

Furthermore, in quantity production of planes it is desirable to permit the assemblage of the various elements in jigs and similar contrivances which help shape the parts and hold them in position while they are being assembled. For this purpose the plane is thus divided in a new and improved manner into a plurality of units, each of which may be completely sub-assembled and some of these sub-assembled units may themselves be composed of component assembled units. For example, in the form shown, the fuselage itself comprises a nose section, a cabin section and a tail section, while the nose section includes the power plant and the control section. This nose section, for example, may be completely assembled to permit the testing of the engine and propeller and the engine controls, since it is complete in itself save only for the fuel line.

It is a further object to reduce the head resistance or drift of the plane to a minimum and to this end the fuselage and wings, although separately fabricatable and preferably capable of relative articulation, are interfitted in an improved manner so that the thickness of the wing may be utilized as a portion of the head room within the cabin.

It is a further object to so arrange the cabin and the wing that a greater range of vision is maintained in all directions without interference by the wings and without so exposing the cabin as to create undue drift.

It is a further object to provide a new and improved airplane in which the wings may be caused to present the proper angle for flying and for alighting while, at the same time, utilizing a landing gear close to the body of the fuselage, thus making unnecessary an undue projection of the landing gear.

It is a further object to provide a plane in which the exhaust of the motors may be utilized to heat the cabin and in which the noise of the exhaust is substantially muffled without adding to the weight of the plane or causing back pressure.

It is a further object to provide a plane in which the landing gear may have great freedom of movement. In general I prefer to so arrange the parts that the landing gear will permit the belly of the plane to touch the ground before damaging the landing gear. At the same time means are provided for absorbing the recoil of the landing gear.

The invention accordingly comprises a machine possessing the features, properties and relations of elements exemplified in the following description, the scope of the application of which will be indicated in the claims.

Fig. 1 is a plan view of a plane embodying this invention, one wing being broken away to facilitate illustration and to show the landing gear.

Fig. 2 is a side elevation of the same.

Fig. 3 is a front elevation of the plane, the power plant being removed.

Fig. 4 is a view in side elevation, parts being broken away to show the frame work of the fuselage and its relation to the tail section.

Fig. 5 is a plan view of the fuselage frame and its relation to the tail section.

Fig. 6 is a front elevation of the fuselage frame.

Fig. 7 is a plan view of the cabin portion of the fuselage, the top being removed to show the interior construction and brake control.

Fig. 8 is a view from the interior of the cabin section looking forward toward the nose section, showing the control.

Fig. 9 is a perspective view of the frame work of the nose section which supports the engine from the fuselage frame.

Figs. 10, 11 and 12 are sections along the lines 10—10 and 11—11 and 12—12 of Fig. 2.

Fig. 13 is a detail showing the means for attaching the braces to the fuselage skin.

Fig. 14 is a cross section of the wing showing the frame construction and wing tilting mechanism.

Fig. 15 is a detail of the brake-operating mechanism.

Fig. 16 is a perspective view illustrating the aileron and elevator control mechanism.

Fig. 17 is a similar view showing the rudder control mechanism.

Fig. 18 is a detail showing one form of shock-absorbing buffer construction for the landing gear.

Fig. 19 is a detail of a bracket for joining the nose section to the fuselage.

Fig. 20 is a detail on the line 20—20 of Fig. 16.

Figure 21:
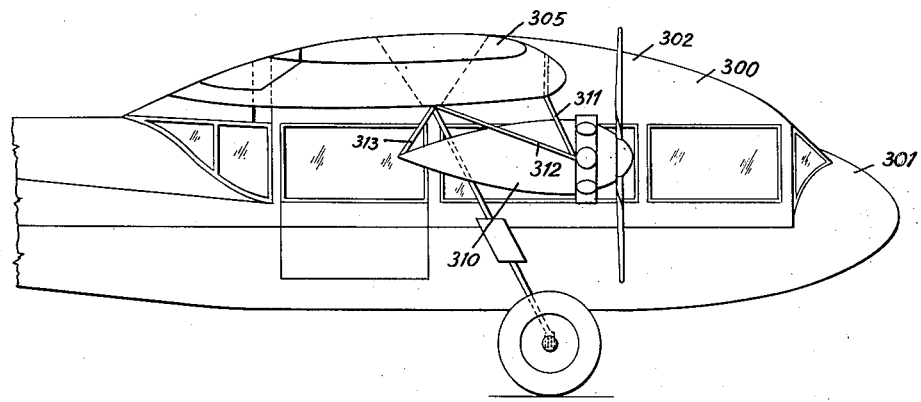

Fig. 21 is a side elevation of a modification in which a plurality of engines are employed.

Figure 22:
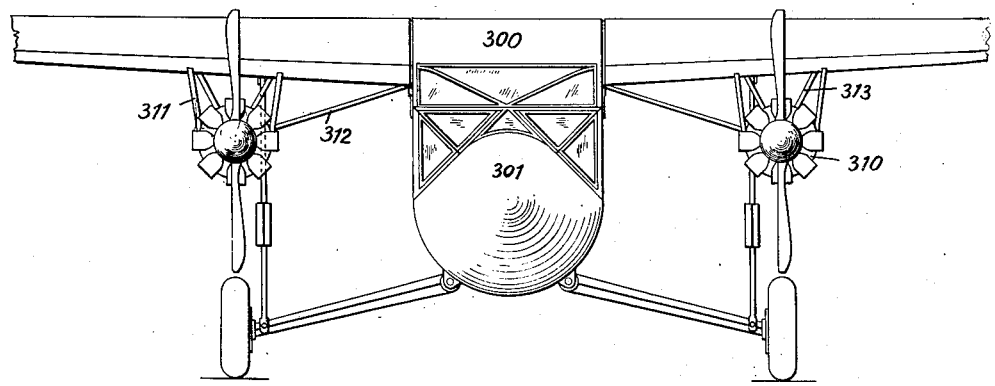

Fig. 22 is a front elevation of the same.

Figure 23:
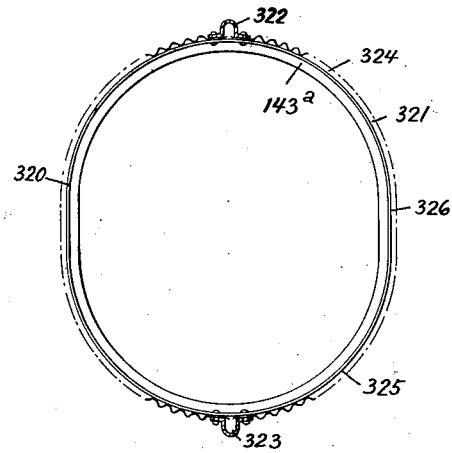

Fig. 23 is a cross section of a modified form of tail construction.

Figure 24:
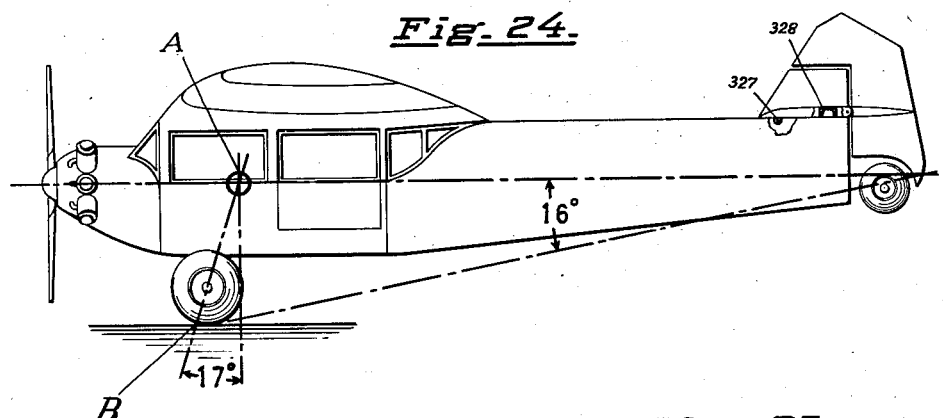

Fig. 24 is a somewhat diagrammatic side elevation of a ship embodying the present invention.

Figure 25:
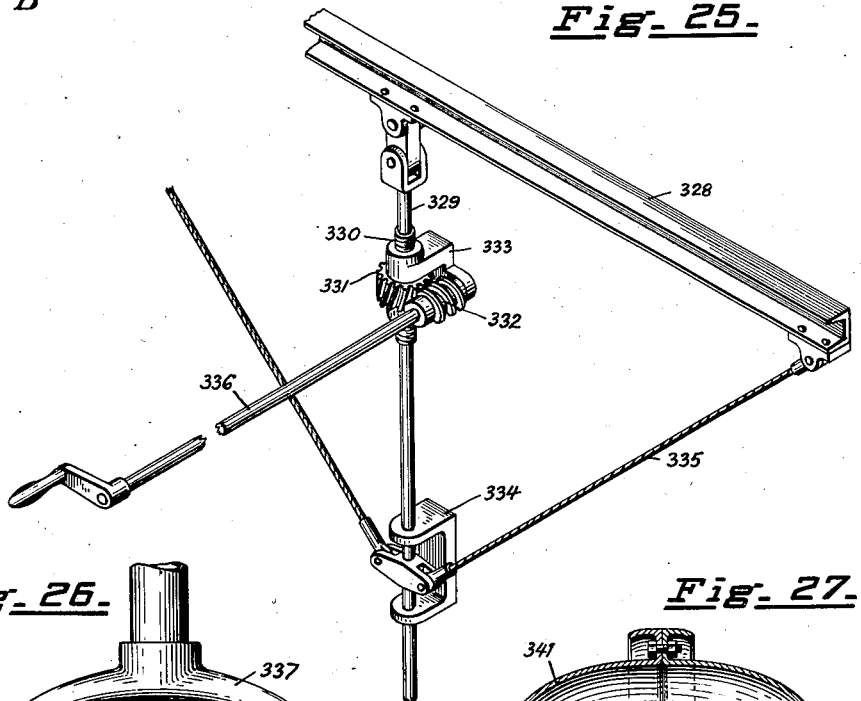

Fig. 25 is a perspective view of a stabilizer structure, and

Figure 26:
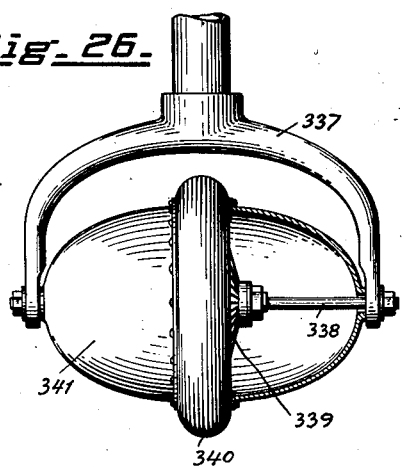
Figure 27:
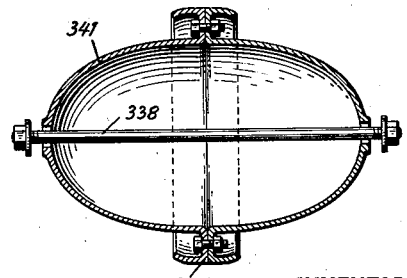

Figs. 26 and 27 show wheel or ground contact members which may be associated with the landing gear.

The airplane as herein illustrated comprises generally a fuselage portion 1, wing portion 2, propeller 3, empennage 4, landing gear 5.

The fuselage comprises, generally, three principal sections,—a nose section 10, a cabin section 11, and a tail section 12, which constitute separably assemblable units. The nose section 10 carries the engine 13 and the propeller 3; and the controls to be described. The cabin section 11 connects the nose section, the wing section and the tail section. The tail section 12 carries the empennage 4.

The cabin section comprises an interior frame work preferably made of channel members of aluminum alloy, such for example as duralumin, and of such shape and construction as to connect the nose section, the wing, the tail section and the landing gear directly together. As illustrated, this framework comprises three generally U-shaped members 20, 21, and 22, hereinafter referred to as uprights, which are connected to each other on each side by longitudinal members 23 and 24, and the top ends of each of the uprights are connected by cross members 27, 28, and 29. A beam 30 runs from front to back at each side of the bottom of the uprights, thus connecting them together, and at the same time furnishing the support for the floor 31. A diagonal brace 32 on each side extends from the juncture of the members 24 with the front upright 20 downwardly and backwardly to meet the beam 30 and upright 21.

A pair of brackets 33 and 34 are attached to each of the beams 30, one set being on each side of the plane to carry diagonal struts 35 and 36 to support the landing gear wheel 39, while a vertical strut 37 extends upwardly from the landing gear to connect with the wing frame at 38. This connection is made directly to one of the longitudinal wing spars to be described. This vertical strut 37 which supports the landing gear carries with it a housing 40 containing a shock absorbing element 41. The housing is omitted from some of the views for clarity. As illustrated, the strut 37 is composed of two telescoping parts 42 and 43. Each of these parts carries a bracket 44 and 45 having flanges provided with openings 46, 47 for one of a plurality of bolts or rods 48. A plurality of such flanges are preferably symmetrically arranged around the strut 37, together with a corresponding number of bolts 48. A plurality of rubber washers 49 are disposed upon each of the bolts 48 between the bracket 44 and the bracket 45, and washers 50 are placed upon the bolt at each end outside of the brackets 44 and 45, while nuts 51 hold the parts in assembled position. Any impact upon the landing gear will be taken by the compression of the washers 49, while the rebound will be absorbed by the washers 50. The struts 35 and 36 preferably are arranged to constitute a single rigid bracket at their outer end to which the vertical strut is connected, and this bracket carries the axle 32 for the landing gear wheel 39.

The fuselage framework carries at its upper end, preferably immediately above and attached to the central upright 21 a pivot plate 60 having an opening 61 by which the wing may be pivoted to the frame. The nose section has, in general, a framework which mounts the covering therefor and, by reason of the stress imposed upon this portion of the frame, and to rigidify the connection between the power plant and the fuselage, this frame is preferably composed of steel tubing welded together at the meeting points. This framework is designed to fit at its rear side upon the front of the framework of the fuselage and to carry at its front end mechanism by which the engine and propeller may be readily attached. It is arranged to house and support the controls.

A convenient construction for this frame comprises a plurality of diagonal struts which are adapted to be attached to the fuselage frame at spaced points and to be brought together and attached to the combined exhaust manifold and engine supporting ring. As best illustrated in Fig. 9, there are eight such principal supports, three on each side designated as 65, 66 and 67. The struts 65, 66 and 67 are joined together and to the exhaust manifold at the side, as shown at 69, and extend from there rearwardly in tripod formation, struts 66 and 67 being joined to the upright 20 at spaced points, 70 and 71 respectively, while the strut 65 forms one of a series of six, radiating from an apex 75. Of these, two designated as 76 and 77 extend rearwardly to join the upright 20 at spaced points 70 and 79 respectively, while the member 78 joins the corresponding strut from the other side at the center of the cross member 27, as shown at 80. One of the arms extending from the apex 75, here designated as 81, extends diagonally forward to meet a corresponding arm from the other side, at the center of the top of the exhaust manifold, as shown at 82, while the other strut 83 joins the two apices 75. A cross strut 84 preferably connects one side of the frame with the other by connecting the arms 66 with each other substantially at their rear ends.

By the above construction it will be seen that the engine is braced to the frame by a series of rigid triangles effectively resisting strains both in direct thrust and in torque.

In Figure 19 is illustrated a bracket adapted to serve to connect one of the struts 77 with the upright 20. As illustrated this comprises a plate 90 adapted to lie flat against the face of the upright 20 and having flanges 91, 92 and 93 adapted to engage the cross members 27, the side member 23 and a member extending diagonally upward toward the wing to be described. The angle of these flanges at these plates is such as to lie flat against the members involved, whereby the plate serves firmly to attach the frame members together. To permit the ready attachment of the nose section to the fuselage frame this bracket has a pair of outstanding ears 94 adapted to receive between them the strut 77, and having an opening 95 to receive a connecting bolt or rivet. In this manner the nose section may be removed from the plane as a unit merely by removing the bolts or rivets and without disassembling any portion of either unit.

Extending from the forward upright 20 upwardly inclined to the rear, is a frame comprising lateral arms 99 at each side of the uprights and diagonal arms 100 extending from the point 80 to the rear end of the arms 99, where they are connected by a cross strut 100a. A pair of downwardly and backwardly inclined struts 101 connect the rear ends of the arms 99 and 100 with the pivot plate 60. The general curvature of the members 99 and 100 is such as to incline upwardly toward the wing in a flat surface, until that surface becomes substantially tangent with the wing surface, and thereafter to conform to the wing surface, as shown at 102.

In the rear is a bracket 104 comprising vertical struts 105 at the rear upright 22 and inclined struts 106 extending upwardly and rearwardly from the pivot plate 60. One such bracket is provided at each side of the machine. Another bracket 108 comprises the curved, inclined strut 109 and vertical strut 110, it being understood that the general conformation of the members 102, 104 and 109 coincides with the upper surface of the wing contour, as will be hereinafter more fully brought forth, while the space between the struts 105 and 110 forms a slot or well in which one of the longitudinal beams of the wing is adapted to move.

This bracket 108 is carried by a supplemental frame 111 extending rearwardly from the upright 22 and comprising a horizontal member 112 and a curved member 113 extending from a mid-point of the upright 22 backwardly to the rear of the member 112. The members 112 and 113 may be braced together at an intermediate point by a vertical strut 114. It will be understood that the members 109, 112 and 113 on one side of the machine are inclined inwardly toward the center to meet at a common point, with each other and with the corresponding members from the other side of the machine, as shown at 114a. The member 113 is curved to conform to the surface of the tail portion as will be hereinafter described.

The cover for the body comprises, in general, vertical plates 118 and a curved plate 119. For structural reasons these plates and the other principal plates constituting the skin are preferably made of corrugated material, some of these corrugated plates being bent into curved form and some of them remaining flat, but this latter term is not intended to mean that it is devoid of corrugations, but rather that the corrugated sheet is not curved as a whole. In this sense of the word the vertical side plates 118 of the cabin skin are flat and extend from the upper portion of the braces 102 and 104 and 109 down to the mid portion of the side of the cabin, where they meet the lower curved plate 119. They extend from the forward upright 20 to the rear upright 23. They are cut out as at 127 to provide for windows.

Plate 119 is adapted to close the lower half of the cabin and is in semi-cylindrical form, extending under the body from the longitudinal member 24 on one side, to the corresponding member on the other side, it being understood that it is cut at appropriate points for the brackets 33 and 34 supporting the running gear.

A door 122 is fitted within an opening provided in the plates 118, 119 and the longitudinal member 24. This door carries at its upper half a second window 123. The outer contour of the door conforms to the outer contour of the remaining portions of the body, so that when the door is closed the outer contour is uninterrupted.

The spaces defined by the members 22, 112, 113 and 114 will be suitably closed by windows 125, 126 and the small space above these windows may be closed by plates 127. The upper surface of the body between the two members 100a and between the members 104 and between the members 109 is also suitably enclosed, but windows 128 and 129 may be provided if desired. This lateral window 129 serves as a manhole from which the upper surfaces of the plane may be reached.

The nose portion of the machine is enclosed by a convexed member 132. In the plane illustrated this constitutes the only portion of the skin which is not made with straight line element curves.

The tail section of the machine in the form illustrated in Figs. 1 and 2 comprises upper and lower members 136, 137 and two side members 138. The upper and lower members are in the form of half cones, the member 137 being at its forward end of a diameter to conform to the curvature of the bottom half of the frame member 22, and tapering from there regularly to a very much smaller diameter at the tail. The member 136 is of the same curvature and in practice a similar section will be used, except that the upper member 136 will be cut out for attachment to and to conform to the contour of the member 113 of the frame, a simple act which may be done at the time of assembly. The side members 138 in general do not require to be curved, these plates being attached to the members 136 and 137 along their straight line elements. The side plate, however, increases in width from the front and toward the back, so that the tail section from front to rear has a diminution in thickness greater than the diminution in height. At the extreme rear end each of the members 136 and 137 is cut away, as shown at 140, and the members 138 are correspondingly increased in width and bent toward the vertical central plane in order to bring all of the members together for joining at a vertical rudder post 141.

The tail section, in general, relies upon the skin surface as the main stress resisting member. This, however, may be reinforced at intervals by a circumferential channel member 143 riveted to the skin and strengthened by crossed arms 144 and 145, which may be attached to the flange of the channel as shown in Figure 13.

Where the form of surface just described is employed comprising the upper and lower circumferential members and the lateral flat members, the crossed arms 144 and 145 will preferably terminate adjacent to the longitudinal seams of the skin. As illustrated three such reinforcing members are provided throughout the length of the tail intended, primarily, to resist collapsing strains.

In the embodiments illustrated in this application any suitable type of motor or motors may be employed as, for example, the Wright whirlwind type, which embraces a plurality of radial cylinders 150. In the single motor embodiment, all of these cylinders may discharge into a common exhaust 151. This exhaust conduit, as will be seen from Figure 6, (takes the form of a ring substantially concentric with the motor, but it is constructed with sufficient strength of itself to serve as the means by which the motor is attached to the machine. To this end the exhaust ring or conduit is provided with a plurality of lugs 152 for connection to nose framework at the point at 69 and 82, while a corresponding set of lugs 153 serves as a means by which the motor itself may be bolted to the exhaust ring. This exhaust ring has its discharge downwardly, as shown at 151a, into a conduit 154 running lengthwise of the body of the plane between the floor 31 and the skin. The exhaust conduit is firmly braced to each of the uprights 20, 21 and 22 by plates 155, to which the conduit itself is attached by brackets 156. In this manner not only is the conduit itself firmly held in place, but it serves the additional function of furnishing a rigid and strong support or keel for the bottom of the machine.

The plane is provided with a rudder 160, which may be pivoted, as shown at 161, to the rudder post 141 and be under control of steering mechanism through the medium of rods 205 and 208 hereinafter described.

At the extreme rear of the machine there is provided a wheel 163 in place of the usual tail skid. This wheel may be pivoted upon a bracket 164 mounted below the rudder mechanism. As illustrated, this wheel has its own axis 163a to the rear of the axis of the pivot 164, so that there is a moment of force tending to turn the wheel in any direction of travel required by the movement of the tail, permitting to align itself with the movement. If preferred the wheel may be itself mounted for movement with the rudder on to the control of the rudder control mechanism.

It will be understood that with this plane, having as it does mechanism permitting the changing of the angle of the wing and mechanism for directly applying brakes to the wheels, that the drag effect imposed by the trailing skid is not required. If desired, however, brakes may also be applied to the tail wheel. The plane is also provided with a stabilizer 165. This stabilizer may be carried from the rudder post 141, to which it may be attached. It is supported from the upper tail skin member 136 and it is braced by a vertical plate 166 which extends from an upward projection 167 of the rudder post forwardly to meet the upper surface of the member 136 and the stabilizer. This vertical plate serves to give lateral stability. The stabilizer itself has a decided rake at its forward edge toward the sides and rear. The stabilizer has at its rear edge a channel beam which serves as a means to which the elevator 168 may be pivoted, as shown at 169. The elevator is connected to the control mechanism by control rod 170.

The wing itself is preferably in the form of a cantilever in which the skin and the interior frame-work are so co-ordinated as to themselves resist all the necessary stresses without external bracing. As in my previous inventions, this is preferably accomplished by providing an interior frame which is capable of withstanding the flexure strains and a skin surface which is capable of resisting the torsional strains so co-ordinated that the skin surface assists in tying together the frame members and that the frame assists the skin in preventing buckling and collapse.

As will be clear from Figure 14 three generally longitudinal beams are provided in the wing indicated at 175, 176, and 177. The beams 175 and 177, which are near the leading and trailing edges respectively, may assume the form of shallow channels, that is, of upright plates having short horizontal flanges at top and bottom. The central beam 176, however, is preferably of triangular form, comprising three longitudinal members 178, 179 and 180, which are joined together at suitable intervals by braces 181. The triangular beam 176 has its apex downwardly, substantially beneath the center of pressure of the wing and the lower member 180 carries brackets 182, by which the wing is pivoted to the plane. The beams 176 and 177 are substantially continuous from wing tip to wing tip, while the beam 175 is interrupted at the body.

The skin of each wing comprises, in general, three portions: an upper plate 185, a lower plate 186, and a leading edge section 187. The upper and lower plates extend from the beam 175 to the trailing edge of the wing, except opposite the ailerons, where they terminate at the beam 177. The other section on the wing skin 187, is bent around from the top to bottom of the beam 175 to further brace that beam and furnish the leading edge contour of the wing. This skin itself cooperates with the rib structure and counteracts the torsional wing strains as well. Diagonal struts 188 and 189 are provided from the upper edge of the triangular spar to the lower edge of the spars 175 and 177 respectively, to give additional rigidity to the wing under torsional stresses. The lower wing surface is completely cut away at the body portion, while the upper wing surface has a narrow connection immediately over the flap top of the triangular beam, it otherwise being also cut away. With this construction it will be evident that the central portion of the triangular beam is adapted to fit down between the brackets 101 and 106 when the wing is pivoted in place, while the channel between the members 105 and 110 is proportioned and so spaced from the pivot as to receive the beam 177 as it extends from one said portion of the wing, the other unsupported by the wing skin. It will now be clear that when the wing is in place the covering on the upper side of the brackets 102, 104, and 109 and the skin surface on the upper side of the triangular beam, furnish a combined contour which, in general, agrees with that of the remaining portions of the wing.

This construction is designed to permit a limited pivotal movement of the wing and to make this possible the angularity between braces 101 and 106 is greater than the apex angle of the triangular spar, differing from it by slightly more than the amount of angularity of movement desired in the wing. This construction affords a certain discontinuity in the upper surface of the plane, as illustrated in Fig. 1 at 191. This discontinuity is preferably covered by a flexible flap, as shown at 192, which may be attached to the front edge of each of these openings and slidingly extend over the rear edge bridging the space between them and yet allowing for the angularity of movement.

It is generally desirable completely to enclose the wing and the body and to this end means are provided for closing each at the point where it is cut away to inter-fit with the other. To this end sides of the body portion are extended upwardly to the top of the framework as seen in Figure 4, as defined by the members 102, 104 and 109, while the cut away portion defined by the members 101 and 106 and the pit defined by the members 105 and 110 are closed across from one side of the machine to the other. Similarly the wing at the cut away portion has its sides closed.

The trailing edge of the wing is cut away to the rear of the beam 177 to provide room for ailerons 193, which may itself assume the contour of the cut away portion of the wing, as shown in Fig. 1. This aileron may be pivoted, as shown at 194, to the beam 177 and controlled from the cabin by control wires 195.

With the exception of the skin for the nose and the sheet 187 forming the leading edge of the wing, all of the skin surfaces are preferably made of corrugated metal. It will be observed that in the preferred embodiment shown the contour of the wing surface does not change from root to tip, the wing taper being accomplished by a change in the length of the arc employed. Thus the upper and lower wing surfaces 186 and 185, as well as the corrugated portions of the fuselage skin and the control surfaces, are all straight line element curves, that is, either cones or cylinders which can be formed from the sheet metal by bending around a mandrel without the type of shaping which is necessary where surfaces are employed which are curved in two planes. This fact contributes materially to the economy of building the plane, while at the same time, because of the manner of associating these elements, the full stream line effect is obtained. If desired, the skin for the nose section and for the leading edge may also be corrugated, but it will in general be found that the gain is not commensurate with the cost.

Now referring to the controls, which are preferably employed, it will be observed that these consist, in general, of the rudder, the elevator, the ailerons, the mechanism for tilting the wing upon its pivots, and the brakes. The plane illustrated is in general designed as a plane having two control seats provided with a control mechanism, operable from either. The rudder is under the control of the foot levers, the elevator and ailerons are controlled by the joy stick, while the brakes are operated by an auxiliary hand lever and the aspect angle of the plane itself is under control of a separate wheel.

The rudder control is as follows, as will be seen from Fig. 7 and Fig. 17:—The front seat 200 of the plane is double width, to provide for the two operators seated side by side, and in front of the said seat are pivoted a pair of rods 201, 202, each carrying a pair of foot pedals 203, 204, opposite each pilot, these being so connected that the depression of either pedal 203 will rotate the rod 202 or the depression of either pedal 204 will rotate the rod 201. The rod 202 is operatively connected through a control rod 205, with one arm 206 of a three arm lever 207, which controls the rudder, while the rod 201 is connected by a rod 208 with an arm 209 of the lever 207 opposed to the arm 206. By this construction it will be clear that the depression of the pedal 203 rotates the rudder to the left, raising the pedal 204. The elevator and aileron control will be seen in Fig. 16. A shaft 215 is pivoted in brackets 216 at the sides of the upper portion cabin in front of the pilot's seat, and this shaft carries depending arms 217 to which the control rods 170 of the elevator are attached. The shaft 215 has pivoted at its center a control stick 218, the pivot being so arranged that the stick may be swung from side to side without affecting the position of the shaft 215, but the forward or backward movement of the stick will cause rotation of the shaft 215 to cause depression or raising of the elevators. The shaft 215 carries at its central portion a plate 219 having notches 220 and the stick 218 has pivoted thereto a latch 221 controlled by a weight 222 having a finger 223 in postion to enter the notch 220 in the plate 219, and the notches 220 are so positioned that the control stick may be held in postion opposite either the left or right-hand pilot at will, being equally operative in either position.

The stick 218 is hollow and serves as a bearing for a shaft 225, which carries at its upper end an arm 226 to which the controls for the ailerons are attached. At the lower end of the shaft 225 is a pair of bevel gears 227, 228 meshing with similar gear upon a stub shaft 229 carried by the stick. This stub shaft is, and consequently the lever 226 and the ailerons are under control of a hand wheel 230.

With the foregoing construction it will be evident that a fore and aft movement of the stick will actuate the elevator, while a rotation of the wheel will bank the machine by operating the ailerons. Should it be desired to shift the control from one pilot to the other, this may be readily done by lifting the latch 221 and swinging the stick to the other side, whereupon it will be accessible to the other pilot.

Each of the front landing gear wheels of this machine has a brake mechanism under separate control. As will be seen from Figure 15, each wheel has an interior brake drum 240 housing brake shoes 241, which are pivoted at one end, as shown at 242, to a block 243 carried by the axle frame. These brake shoes are drawn together by a spring 244 attached at its ends to brackets 245 carried by the brake shoe. At their upper end these brake shoes are connected respectively to a cylinder 246 and a piston 247, such that the relative movement of the piston and cylinder will cause outward movement of the brake shoes to bear against the brake drum. Within the cabin and accessible to both pilots is a lever 250 which is preferably pivoted at its base in a ball and socket joint 251. Operatively associated with said lever is a pair of cylinders 252 and pistons 253, such that a movement of the lever will effect relative movement of the cylinders and pistons. As illustrated, the cylinders are rigidly attached to the frame of the plane and the pistons are connected to the lever 250 by connecting rods through the medium of ball and socket connections 254. The interior of the cylinder 252 is connected to the interior of the cylinder 246 by a conduit 255. The interior of the cylinders 246 and 252 and of the conduit 255 is filled with an incompressible liquid such as water or oil. With this construction the movement of the lever 250 in such direction as to compress the liquid within the cylinder 252 will effect relative movement between the piston 247 and the cylinder 246 to set the brake on the wheel. One such system is provided for each wheel, but the two cylinders 252 are arranged at right angles to each other, so that the lever 250 may be moved toward either cylinder independently without affecting the other, or may be moved straight back thereby simultaneously operating both brakes.

The wing may be tilted by a screw and nut generally designated by 255.

The interior of the triangular spar 176 serves as a convenient location for the gas tank 260, and one such tank may be provided in each side of the plane.

The interior of the cabin may be provided with lateral seats 270, 271, one on each side, having a table between them, as shown at 272. In this manner the curved construction of the under portion of the body does not effect a reduction in the valuable head room, since it occurs beneath the seats. The seat 271 on the side carrying the door is itself carried by the door. In order to permit access to the car, therefore, this seat is pivoted, as shown at 273, to the door, so that it may be folded up flat against the door when the latter is open and substantially folded down into place after the door is closed. The table 272 is preferably firmly attached to the floor, and its location relative to the seats 270 and 271 is such that the knees of the persons, when seated, are beneath the table, so that if the plane should be subjected to a sudden drop on reaching an air pocket, the persons would be constrained to movement with the plane. The cabin is closed at the rear by a partition 275 having at the center a door 276 affording entrance to the tail section of the plane, and within the forward part of this tail section a toilet may be provided. To this end the floor section may be carried backward into the forward end of the tail section, as shown at 278. The pilots' seats 200 may be provided with backs 280 and 281, but one of these as, for example, 281, is arranged to fold downwardly over the seat to permit the pilot to climb into place.

In Figures 21 and 22 is illustrated another form of the invention, in which a plurality of engines are provided, one on each side of the cabin and preferably arranged spaced from the cabin. In this embodiment the body portion is substantially similar to the body portions hereinbefore described, save that its nose portion 301 is projected further forward to restore the weight balance. This extended nose portion, as will be seen at 302, is so designed as to carry the stream line contour substantially to the top of the wing section as in the previous embodiment. The wing 305 is substantially of similar construction to that previously described, save that as this embodiment is primarily intended for a heavier plane, the construction may be of correspondingly greater strength. The motors 310 are suspended by brackets from the framework of the wing. These brackets may be as follows:—

A pair of arms 311 may connect the two sides of the motor with the front wing beam 175 and a similar pair of arms 312 may extend from the same point on the motor to the triangular spar beam 176. An arm 313 may connect the tail end of the motor with the beam 176, while a cross brace 314 extends inwardly from this same point to join the beam 176 near the fuselage. It will be seen that the above form of construction provides a rigid support both horizontally, laterally and torsionally.

It will be understood that this embodiment of the invention is provided with the same controls as the previously described embodiment, including the brakes upon the wheels, and with this construction there is specific advantage in providing a plurality of spaced motors, as herein disclosed, since it facilitates the dirigibility of the plane, particularly in taxiing. Thus, for example, if it be desired to turn the machine sharply around it is possible to shut off one motor and brake the corresponding wheel, whereupon the opposing propeller will turn the machine about the locked wheel as an axis.

In Figure 23 is illustrated a modification of a form of skin which may be employed for the tail. This tail section may be of substantially the same contour as that previously described, but instead of forming the tail skin of four sections riveted to each other it is, in this modification, formed of two sections, 320 and 321, which are joined together top and bottom through the medium of longitudinal channels 322 and 323, to the flanges of which the skin sections may be riveted. Each of these skin sections may comprise two circular quadrantal cone portions 324 and 325 joined together by a flat portion 326, thus giving the tail the contour of the previous modification. The radius of the conical portions may diminish toward the tail, while the height of the flat portion 326 may increase toward the tail. This wing section may, as in the previous modification, be reinforced at intervals by the circumferential channels 143a. It may be also provided with the cross members 144 and 145, if desired.

It will be observed, in the construction of this plane that wherever possible each element is made to perform a plurality of consistent functions, for example, the exhaust ring from the engine is itself made to serve as the connecting link by which the engine is attached to the plane. Similarly, the exhaust pipe extending through the floor of the car and rigidly braced to the U-frames, serves not only as an integral part of the airplane frame, but also serves as a keel which in itself can materially assist in withstanding landing strains if for any reason the landing gear should become defective and as a means for heating the cabin. Similarly, the skin is used throughout the plane as a strain resisting element and to obtain the maximum effect therefrom, it is preferred that corrugated metal be employed. It being desired, however, that the corrugation shall extend in the direction of the air stream, the plane is designed to make the maximum strain taken by the skin throughout the plane to be in the fore and aft direction. Thus, in the wings where the corrugations run transverse to the wings, the framework is designed to withstand the strains of torsion while in the body, and particularly in the tail, where the corrugations run longitudinally, the chief strains imposed upon the skin are strains of flexure. The mounting of the tail wheel is such that it may be swung through an angle of almost 180 degrees, whereby it may be brought at right angles to the line connecting it with either of the front wheels. With this construction, and with the controls provided, it is possible to turn the plane around either of the front wheels as a pivot. This situation can be very quickly reversed by the opposite movement of the brake which makes possible a very great maneuverability when taxiing. This dirigibility is still further increased when the plurality of separately controlled engines are employed as in the second modification by shutting off one engine when applying the corresponding brake. Moreover, by reason of the fact that brakes are employed upon the landing wheels, the ship may be brought to rest within a minimum distance after touching the ground, and furthermore, if it be desired, the angle of the plane may be changed after reaching the ground, so as to increase the drift while reducing the lift. The plane may be thus brought to a still shorter stop since this produces an additional drag upon the plane, and in addition increases the effect of the brakes by increasing the weight upon the braked wheels.

It will be observed that the different portions of the plane may be readily assembled as complete and separate units. Thus, the engine and propeller may be placed as a unit, while the entire nose section, the entire tail section, the fuselage body and the wings each constitute separate, complete units capable of complete, separate fabrication prior to assemblage. This not only increases the possibilities of quantity production, making it feasible to form the various parts with jigs and tools, but it also makes possible the employment of a larger number of men in the fabrication, without getting in each other's way, and hence makes possible a speedier production with a corresponding lowering of overhead costs.

It will be observed, with reference to Fig. 24, that the landing gear is located relatively far forward of the center of gravity. According to the present invention it is preferred that the ground contact portion of such landing gear be, in fact, disposed at least 17 degrees in advance of the center of gravity, which has been indicated at A, the ground contact portion of the landing gear having been indicated at B. This ground contact portion of the landing gear is disposed with reference to the rear or empennage section of the fuselage at an angle of 16 degrees and as aforedescribed, the stabilizer surface is preferably relatively large. By this construction it has been found that the probabilities of crashes occurring incident to "taking off" and landing, and particularly the latter, are reduced to a minimum. By virtue of the fact that the stabilizer surfaces are, as aforestated, relatively large, the problems which might arise in connection with "taking off" a ship of this character are avoided. This is particularly true when it is considered that according to the present invention it is proposed to utilize a brake structure in connection with the landing gear, as shown in Fig. 15. As a consequence, it is entirely feasible to hold the ship against movement with the motor or motors at substantially full throttle. Whereupon, despite the location of the landing gear at a point far forward of the center of gravity, the tail surfaces will lift clear of the ground. Obviously, the same fact will occur if, instead of completely locking the wheels of the landing gear, they are merely "braked". In any event, upon the brakes being released by the pilot the ship will, with this construction, attain a flying speed and "take off" within a minimum distance.

With reference to the stabilizer, it is preferred that, as shown in Fig. 25, a stabilizer which is adjustable by the pilot be employed and in order to provide a rigid construction the stabilizer 4 is pivoted as at 327 to the fuselage frame and this stabilizer has, within its skin, a beam or spar 328 preferably U-shaped in cross section and to which there is attached a rod 329 having a screw-threaded portion 330 with which there cooperates a nut 331 having a worm wheel portion engaged by a worm 332 to be driven by a shaft 336 connected at a point convenient to the operator of the ship. The nut cooperating with the rod rides within a guide 333 secured to the fuselage frame and the lower end of the rod is likewise movable within a guide bracket 334. Braces 335 extend from the ends of the stabilizer spar to the rod and preferably within the space defined by the bracket. As a consequence, when the shaft is rotated, the stabilizer will be rocked and the braces, together with the rear stabilizer spar, will move as one unit, this expedient assuring a rigid construction which will at all times be maintained in proper condition.

With reference to the ground contact members of the landing gear, it will be observed that the legs of the latter may terminate in yoke portions 337 between the arms of which a shaft 338 extends, this shaft mounting a wheel 339 carrying a tire 340. According to the present invention it is preferred that the space between the arms of the yoke and the tire of the wheel be occupied by a cap member 341, one to each side of the tire and forming, virtually, continuations of the surface thereof. These cap members may be formed of metal and in fact, as shown in Fig. 27, may have relatively broad flange portions 342 forming the ground contact part of the landing gear, to thus permit of the elimination of the tire. By this construction it will be understood that a far more stable contact device is provided in the event of a landing in which the wing is tipped.

Reviewing briefly certain of the major features presented in ships embodying the construction suggested in the present specification and drawings, it will primarily be understood that the plane will be inherently stable and readily controlled in flight and that a remarkable ease of landing and take-off will be assured. The facility with which control may be effected is to the greatest extent to be predicated on the fact that, as shown in Fig. 16, and aside from the differential control of the ailerons, connecting elements are employed which extend rearwardly in straight lines and furthermore, by having the connecting elements in the form of a rod the ailerons may be actuated each by a single connecting element disposed adjacent the under side of the wing. Additionally, by having the pilot's control suspended from the ceiling of the cabin or cockpit, it has been found that in certain instances even a more marked facility of control is assured. In this connection it will, of course, be understood that in lieu of the specific arrangement illustrated in Fig. 16, a simple form of "joy stick" may be employed in order to control the elevator and ailerons.

In both of the described embodiments of the invention the occupants of the cabins are assured a maximum outlook due to the disposition of the windows and in the first described embodiment of the invention considerable overhead light is afforded by virtue of the transparent elements which form parts of the upper wing skin or occupy a plane immediately adjacent thereto. In both the three-motor ship, as well as the first described, the safety of the passengers is guarded to a marked degree in the event of a "crash" landing.

An extremely rigid mounting for the motor is assured by employing the exhaust ring construction aforedescribed and the stabilizer will at all times retain its proper relative position with respect to the fuselage if a construction such as that suggested in Fig. 25 is employed. It will also be understood, in connection with the three-motor ship, where obviously separate motor controls are employed, that with the proper throttling of these motors, together with the proper application of braking force to one of the wheels, a large ship may be turned in an extremely small circle.

Finally, it will be appreciated, again referring to the control feature that, as shown, if the tail section of the plane is of relatively high aspect ratio and above the slip-stream of the wing, the stability of control will be remarkably enhanced and that this control will be maintained even at slow landing speeds and when the brakes are somewhat prematurely applied.

It is apparent that numerous changes in construction and rearrangement of the parts might be resorted to without in the slightest departing from the spirit of the invention as described by the following claims.

Having described my invention, what I claim as new and desire to secure by Letters Patent is:—

1. An airplane including, in combination, a body section, a monoplane wing including beams continuous across the body, the upper portion of said body section being cut out to accommodate said beams, means associated with one of said beams for pivoting said wing to said body section, and means associated with another of said beams for effecting a relative tilting movement between said wing and said body section.

2. An airplane including, in combination, a wing having a substantially triangular bracing beam continuous from tip to tip having the apex of the triangular triangle downwardly, a fuselage section having an interior bracing framework including vertical supports and having a V-shaped recess opposite said supports for the accommodation of said triangular beam, and means for pivoting said triangular beam to said vertical supports.

3. An airplane having a plurality of engines and landing wheels including an engine and a wheel on each side of the center line and materially distant therefrom, a brake associated with each of said landing wheels and a control associated with each of said motors adapted to permit the application of the brake to one of the landing wheels and the shutting down of the corresponding motor independently of the application of the other brake and the shutting down of the motor.

4. An airplane including a fuselage and a wing, a motor connected to said wing at each side of said fuselage and materially spaced therefrom and a landing wheel beneath each of said motors adapted to impart its thrust to said wing, a brake mechanism connected to each of said wheels and means for operating said brakes simultaneously or independently at will.

5. An airplane tail section including a skin having conical top and bottom portions tapering toward the rear and connecting flat portions, said flat portions increasing in height from front to rear whereby the tail section has a greater taper in the horizontal plane than in a vertical plane.

6. In an airplane, in combination, a plurality of U-shaped members, a pair of longitudinal beams at spaced points upon the curved portion of the U, and a floor member attached to the upper portions of said beams, a semi-cylindrical skin member on the exterior of said U's and an exhaust conduit extending between said skin and said floor member and rigidly attached to said U's.

7. An airplane comprising a tail section, a cabin section, a nose section, and a wing section, said cabin section having fore and aft members for supporting said nose section and said tail section and a central member for supporting said wing section.

8. An airplane, comprising a tail section, a cabin section, a nose section, and a wing section, said cabin section having a U-shaped member at the front end thereof for supporting said nose section, a central U-shaped member for supporting said wing section and a rear U-shaped member for supporting said tail section.

9. An airplane comprising a fuselage and a wing, a portion of the top of said fuselage being cut away to contain a portion of said wing, the remainder of the top of said fuselage and the portion of said wing merging together to conform with the upper surface of the balance of said wing.

10. An airplane including, in combination a wing having a substantially triangular bracing beam continuous from tip to tip having the apex of the triangle downward, a fuselage section having interior bracing framework including vertical supports and having a V-shaped recess opposite said supports for the accommodation of a triangular beam, means for pivoting said triangular beam to said vertical supports and means for effecting a relative tilting movement between said wing and said fuselage section.

11. A monoplane aircraft comprising a nose section, a cabin section, and a wing section, said cabin section having a central cut away portion to receive a portion of said wing section, the remainder of said cabin section, a portion of said nose section, and the upper surface of said portion of said wing section merging together to form an airfoil upper surface.

12. A monoplane aircraft comprising a nose section, a wing, and a cabin section having a bulging upper portion shaped, except for a central recess, to present an airfoil upper surface, a portion of said nose section, the upper section of said wing, and said upper portion of said cabin section merging together to form an extended airfoil upper surface.

In testimony whereof I affix my signature.
WILLIAM B. STOUT.